United States Patent

[11] 3,604,448

| [72] | Inventors | Rocco Anthony Marrese<br>1024 Belleforte Ave., Oak Park;<br>William T. O'Sullivan, 1323 Ashland,<br>River Forest, both of, Ill. |
|---|---|---|
| [21] | Appl. No. | 874,217 |
| [22] | Filed | Nov. 5, 1969 |
| [45] | Patented | Sept. 14, 1971<br>Continuation-in-part of application Ser. No.<br>790,372, Jan. 10, 1969. |

[54] CLOSED EXHAUST DISCHARGE SYSTEM FOR ANESTHESIA MACHINES
2 Claims, 6 Drawing Figs.

[52] U.S. Cl. .................................................. 137/312,
128/188, 137/583
[51] Int. Cl. ............................................... A61m 17/00,
F16k 45/00
[50] Field of Search ................................................ 128/185,
188, 203–207, 210, 211; 137/312, 612.1, 614.2,
583; 251/DIG. 4

[56] References Cited
UNITED STATES PATENTS

| 313,393 | 3/1885 | Westinghouse | 137/312 X |
| 741,828 | 10/1903 | Presnell | 137/312 X |
| 940,453 | 11/1909 | Fondren | 137/614.2 X |
| 1,339,244 | 5/1920 | Willcox | 137/312 |
| 3,276,446 | 10/1966 | Hay | 128/188 |

*Primary Examiner*—M. Cary Nelson
*Assistant Examiner*—Richard Gerard
*Attorney*—Dominik, Knechtel & Godula

ABSTRACT: A relief valve for anesthetic gasline which is spring loaded to conventionally discharge overloading anesthetic gas into the surrounding atmosphere, and which further is provided with a valve assembly for connection to a closed system so that the overloading anesthetic gas is retained with the closed system and is not discharged to the surrounding atmosphere. The open system of the valve is maintained by making the spring-loaded valve operational, and the closed system is effected by opening the valve assembly so that overloading anesthetic gas is directed through the valve assembly into the closed system, preferably a surgical room vacuum line.

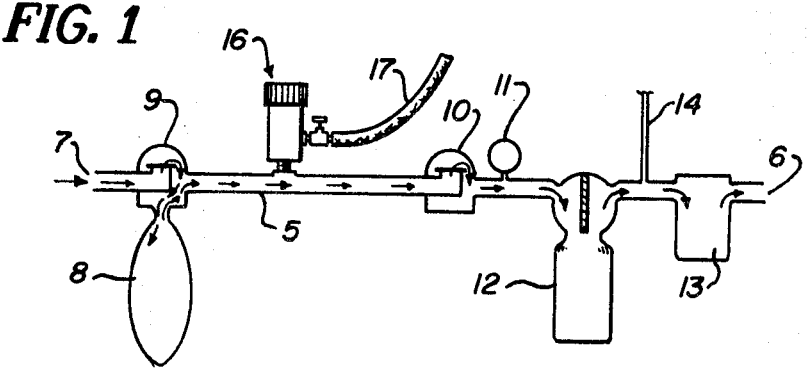
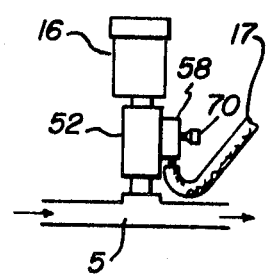
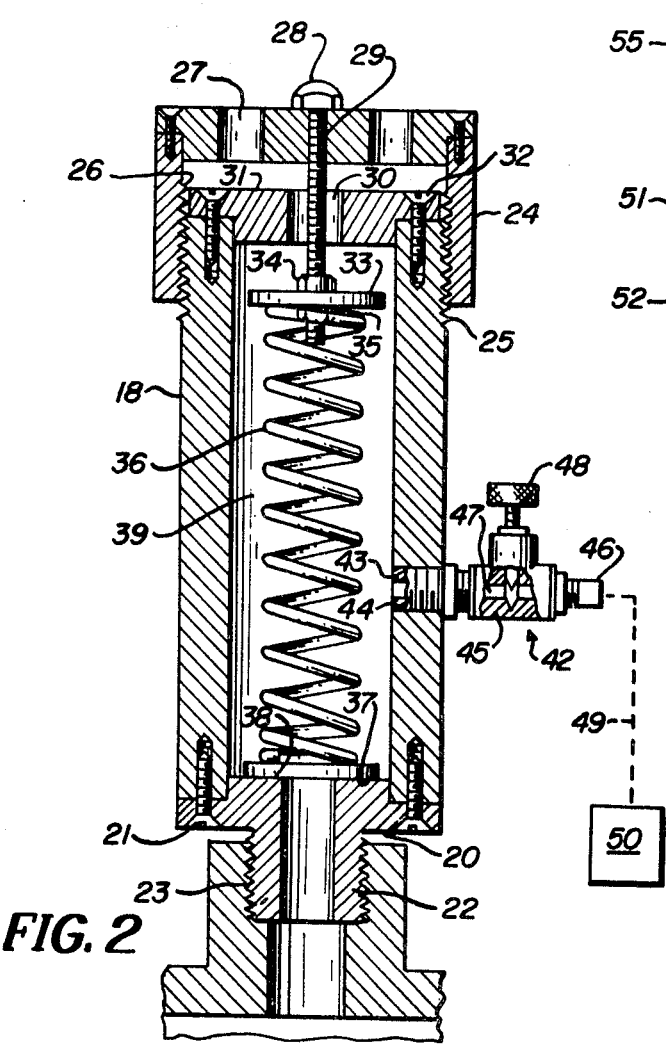
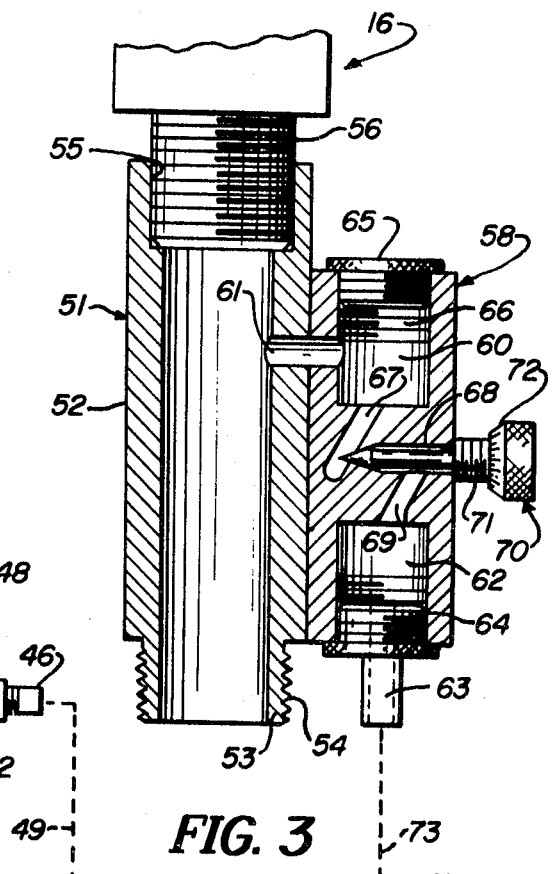
INVENTORS.
R. Anthony Marrese M.D.
BY William T. O'Sullivan
Dominik, Knechtel & Godula
ATTYS.

INVENTORS
R. Anthony Marrese M.D.
William T. O'Sullivan
BY Dominik, Knechtel & Godula
ATTYS.

CLOSED EXHAUST DISCHARGE SYSTEM FOR ANESTHESIA MACHINES

This application in a continuation-in-part of application Ser. No. 790,372 filed Jan. 10, 1969.

This invention relates to a relief valve mountable on anesthetic gaslines in surgical rooms so that overloading anesthetic gas may be selectively directed into a closed system without discharging into the atmosphere of the surgical room.

Relief valves have been used in association with anesthesiology machines, and such valves have been particularly used with semiclosed circular carbon dioxide absorber systems in which gas flow rates in excess of the patient's absorption and consumption rates must be handled by such pressure relief or "pop-off" valves. In addition to preventing excessive pressure buildup in the patient-anesthesia circle, such valves also permit elution of carbon dioxide gases which may possibly be retained.

The relief valves now available are generally spring loaded in which a plate valve is normally urged against the valve seat of a gas pressure outlet in the gasline of an anesthesia machine. When the pressure exceeds predetermined levels, the plate valve is unseated and the gas escapes into the surrounding atmosphere through vents or the like in closure caps on the relief valve. The venting or escape of these anesthetic gases into the surgical room atmosphere is a problem of increasing concern to anesthesia personnel because of their pharmacological effects which may take the form of discomfort or even cytotoxicity. This problem attains serious proportions because of the proximity of surgical room personnel to the anesthesia machine and to the relief valve. It is therefore desirable to provide a means for venting or directing the anesthetic gases into a closed system, and effecting such direction of the gases without objectionably altering the desired pressure levels of the primary patient-anesthesia circle system.

It is likewise desirable to obtain a relief valve and means for directing overloading anesthetic gases into closed systems so that an election is still available for discharging anesthetic gases into the atmosphere, if desired. If adequate means are not available for conveying and collecting the overloading gases in a closed system, then it would be desirable to retain the conventional spring-loaded operation for atmospheric discharge. In any event, a freedom of choice is available to the user with a relief valve and system which allows conventional discharge of overloading gas into the atmosphere, or directing said gas into a closed system and out of contact with the atmosphere.

It is accordingly one important object of the present invention to provide a new and improved relief valve for an anesthesia machine in which overloading gases are directed into a closed system so that surgical room personnel need not make undesirable contact with such gases.

Yet another important object of the invention is to provide a new and improved relief valve in the patient-anesthesia circle wherein overloading anesthetic gases may be quickly, efficiently and reliably diverted into a closed system without upsetting the desired levels of pressure or operation in said circle.

Yet another important object of the invention is to provide an improved relief valve for diverting overloading gases into a closed system, which valve has adapting means for mounting to a conventional anesthetic gasline in an anesthesia machine apparatus.

Yet another important object of the invention is to provide a relief-valve-mounting assembly which can be secured to a conventional anesthetic gas conduit, and which further has means for mounting conventional spring-loaded relief valves for such anesthetic gas machines.

Another object is to provide an improved patient-anesthesia circle system in which overloading anesthetic gases may be diverted into closed systems such as surgical room vacuum lines.

Another object is to provide a patient-anesthesia circle assembly in which a closed system may be quickly and simply established for directing anesthetic gases out of conventional spring-loaded relief valves into flexible tubing connected to surgical room vacuum lines for removal out of the surgical room without contaminating the atmosphere therein.

Objects such as the foregoing are attained, together with still other objects which will occur to practitioners from time to time, by the invention of the following disclosure which includes drawings, wherein:

FIG. 1 is a diagrammatic illustration of features of the patient-anesthesia circle with means for directing overloading anesthetic gas into a closed system;

FIG. 2 is a sectional elevational view, on an enlarged scale relative to FIG. 1, of a spring-loaded relief valve with conventional means for discharging gases into the atmosphere, and with means for directing such gases into a closed system;

FIG. 3 is a sectional view in elevation of an adapter unit to be mounted to an anesthetic gas conduit and to receive conventional spring-loaded relief valves, while providing an assembly, of an alternative embodiment, for directing anesthetic gases into a closed system;

FIG. 4 is a portional and highly diagrammatic illustration indicating the adapter and conventional spring-loaded valve of FIG. 3, on a reduced scale, mounted to an anesthetic gas conduit;

Figure 5:
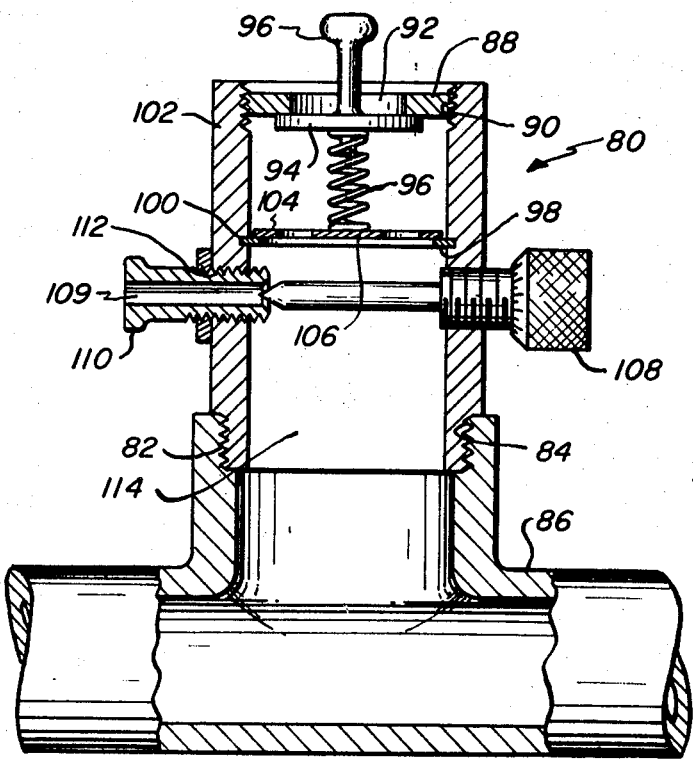
FIG. 5 is a sectional elevational view of an alternative embodiment with automatic negative pressure relief means.

Referring to the drawings, particularly FIG. 1, a gas conduit line 5 has an inhalation end 6 by which the patient receives the mixture, including anesthetic gases, and an exhalation end 7 into which the patient exhales carbon dioxide and any unabsorbed anesthetic gases. The direction depicted by the arrows indicates the inhalation path.

By way of representative illustration, the anesthesia apparatus is shown as having a rebreathing bag 8, an exhalation check valve 9 to prevent patient intake of the exhaled gases, an inhalation check valve 10 to maintain the flow of anesthetic gas mixture towards the patient, a bag pressured gauge 11, a soda lime canister 12 to absorb carbon dioxide, a vaporizer chamber for the gas anesthetic 13, and an anesthetic gas inlet 14. A relief valve is shown generally as 16 mounted to conduit 5, and flexible tubing 17 represents the closed system to which overloading anesthetic gases are directed.

The relief valve shown generally as 16 is seen in greater detail in FIG. 2. The valve includes a housing 18 of generally cylindrical shape formed by continuous wall 19. One end of the housing has a gas port inlet 20 secured to the continuous wall 19 by bolts such as 21. The gas port inlet has a threaded tubular member 22 which is dimensioned to threadably engage a threaded bore indicated 23 of conduit 5. The other end of the housing has a repositionable closure or adjusting cap 24 which may be moved by selectively engaging threads 25 on the housing with threads 26 annularly disposed within the cap 24. The top wall of the adjusting cap is shown with a pair of vents, one of which is indicated at 27. A stud cap nut 28 passes through threaded passageway 29 in the top wall, and extends through enlarged passageway 30 in top plate 31 secured to the top edges of continuous wall 19 by means such as bolts 32. A disc portal valve 33 is secured to stud 28 by top retainer nut 34 and bottom retainer nut 35. These retainer nuts may be repositioned to adjust the tension of the portal valve relative to coil spring 36 which has a bottom disc valve or plate 37 secured to the bottom final turn of the spring. Valve disc 37 is normally urged against valve seat 38 of gas port inlet 20. When the anesthetic gas pressure against lowered disc plate 37 exceeds the tension of spring 36, then disc valve 37 will become unseated and gas will move through the chamber 39 of the relief valve, through passageway 30 and out of vents 27 into the surrounding atmosphere.

A valve assembly shown generally as 42 is shown with threaded end 43 engaged within threaded opening 44 in the continuous wall 19 of the housing. The valve assembly includes a body member 45, a mounting plug end 46 and a passageway 47 extending through the body member, the threaded end and the mounting plug to communicate with chamber 30 of the relief valve. A needle valve 48 is threadably mounted in the body member 45 to selectively reduce the size of the passageway 47. The valve assembly is joined to a closed system which conveys the overloading anesthetic gases along a closed path indicated by dotted line 49 into a closed collection means diagrammatically indicated at 50.

When it is desired to direct the overloading anesthetic gases into the closed system, the adjusting cap 24 is turned downwardly relative to the illustration of FIG. 2 until cover plate 31 is contacted by the top wall of the cap 24. The top surface of top wall or plate 31 will then close the vents 27 to prevent further discharge of the overloading gases into the atmosphere. All the gases will be diverted into the closed system according to selected pressure levels by adjusting needle valve 48. Such gases will be conveyed into a closed path such as flexible tubing 17 and then move into collecting means such as a surgical room vacuum line which may be illustrated by the diagrammatic indication at 50.

An alternative embodiment is shown in the view of FIGS. 3 and 4 wherein a cylindrical adapter housing 51 has a continuous wall 52 which is modified at one end to obtain a reduced-diameter stub or tubular member 53 threaded at 54. The tubular member 53 is dimensioned to threadably engage a threaded bore in the conduit line such as 5. The other end of the adapter housing has a threaded bore or bore socket 55 which is dimensioned to correspond to the diameter of the threaded bore in the conduit line such as 5. Such threaded bore will removably receive threaded tubular member 56 of the conventional spring-loaded relief valve 16. Overloading anesthetic gases will move through chamber 57 of the adapter housing and into relief valve 16 when the pressure of such gases exceeds the tension of a spring such as 36 in the relief valve.

A valve assembly 58 is shown secured to continuous wall 52 of the adapter housing, and the securing means may be welds or the like, which are not shown. The valve assembly includes a body member 59 which has a receiving chamber 60 communicating by way of passageway 61 with chamber 57 in the adapter housing. The body member also has an outlet chamber 62 which empties into mounting outlet plug 63. The mounting plug may have a threaded tubular portion 64 which engages threads within discharge chamber 62. Receiving chamber 60 may likewise be closed by plug 65 having a similar threaded tubular member 66 engaging threads within the receiving chamber. A receiving angular passageway 67 communicates with a lateral passageway 68 and an angular discharge passageway 69. A micrometer-type needle valve 70 is advanced along the lateral passageway 68 through threaded collar 71 to selectively open and close communication between receiving chamber 60 and discharge chamber 64. Scale readings or the like may be provided at 72 on the needle valve.

The adjusting cap of the relief valve 16 will be closed as before so that no gases may be discharged into the atmosphere, and the micrometer needle valve 70 will then be adjusted to selectively attain desired pressure levels in directing overloading anesthetic gases through the valve assembly, into a closed collecting path 73 and into collecting means 74. The collecting means may likewise be flexible tubing such as 17 which joins the valve assembly to collecting means such as a surgical room vacuum supply, which may be diagrammatically indicated at 74.

The adapter housing with the valve assembly mounted thereon allows the improved relief valve to be quickly and conveniently fixed to conventional anesthesia apparatus having conventional means to receive known relief valves such as those indicated herein. It may also be mounted to other related equipment such as mechanical ventilators, nonrebreathing anesthesia circuits and the like.

The alternative embodiment of FIG. 5 has features which protect the patient against excessive or undesirable negative pressure levels during operation. An automatic negative pressure relief valve, shown generally as 80 has a reduced-diameter threaded end 82 so said relief valve may be mounted to threaded bore 84 of anesthetic gas conduit 86.

The top of the valve has a valve seat 88 engaged to threaded bore 90, and this seat valve has an opening 92 which may be opened or closed by a valve diaphragm 94 which is provided with handle 96. The diaphragm valve is normally urged against opening 92 by spring 96, one final turn whereof abuts the bottom of the valve diaphragm 94. The opposite final turn of the spring abuts a support which includes washer or ring 98 mounted within groove 100 in continuous wall 102 of the relief valve. A smaller ring 104 with a diametrical member or spider 106 rests on ring 98. The diametrical member supports the bottom turn of spring 96.

The closed system associated with relief valve 80 includes a micrometer needle valve 108 which is moved into and out of passageway 109 in fitting 110 by small increments. The fitting 110 is mounted in threaded passageway 112 in continuous wall 102, as shown. A closed system is connected to tube fitting 110, such as a hospital vacuum line. When chamber 114 of the relief valve 80 has a negative pressure from the anesthetic gas, atmospheric pressure will bear against the top of the valve diaphragm 94 thereby depressing the valve. The communicating atmospheric pressure thereby balances any negative pressure, thus preventing any undesirable magnitudes of negative pressure to be placed in contact with the patient. If positive anesthetic gas pressure builds up within relief valve 80, then handle 96 may be manually depressed to move valve diaphragm 94 away from opening 92, thereby venting to atmosphere. Alternatively, needle valve 108 may be adjusted to open a communicating path in mounting plug 110, to a desired degree, to thereby vent the positive pressure increase into a closed system mounted to plug 110.

Figure 6:
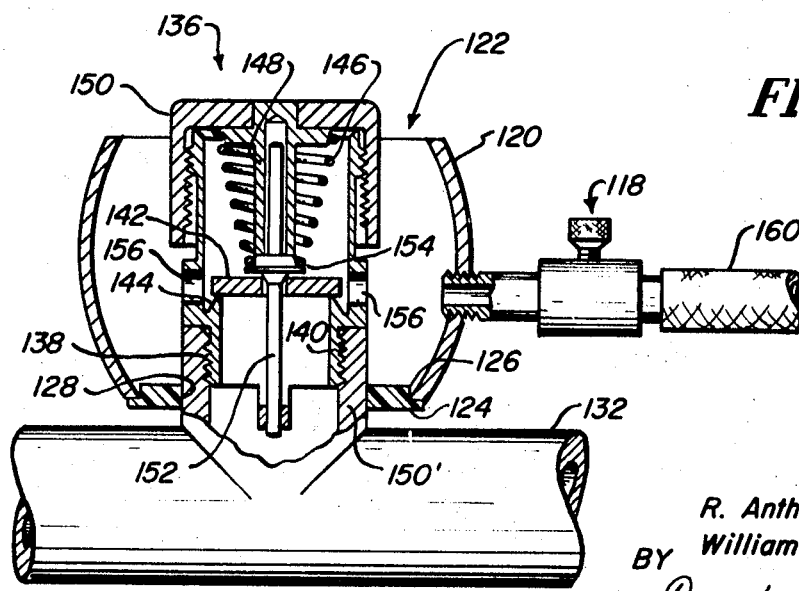
FIG. 6 is a sectional elevational view of an alternative embodiment with a capture chamber means.

An open top capture chamber embodiment is shown in the view of FIG. 6. A needle valve assembly shown generally as 118 is mounted to the continuous and somewhat arcuate wall 120 of the open top capture chamber 122. The bottom of the capture chamber is shown as having a floor 124 with an annular groove 126 which receives the bottom of the continuous arcuate wall 120 in a press fit. The floor 124 has a circular central passageway 128 which is fitted onto arm 130 of anesthetic gas conduit 132. A relief valve 136 has a reduced-diameter threaded bottom 138 which is mounted to threaded bore 140 of arm 130.

The relief valve 136 has a pop-off disk 142 which is normally urged against annular valve seat 144. The pop-off disk is urged against the valve seat by means which include tapered coil spring 146 mounted about center stem 148 which is fixed to a threadable adjustable closure or cap 150. Stem 148 is hollow to accommodate movable rod member 152 which includes a flanged enlargement 154 located at about the midpoint thereof. The spring 146 urges the enlargement against the pop-off disk, and positive pressures within the gas conduit 132 unseat the pop-off disk against the urging of the spring. Whether the pop-off disk is unseated, and the extent to which it is unseated, is controlled by adjustable closure cap 150. The further the cap is turned down on the relief valve, the shorter the distance to which the pop-off disk may be unseated.

In operation, positive pressures from the gas conduit 132 will unseat the pop-off disk 142 so that gases move through vents 156 into the capture chamber. The gases will escape into the capture chamber where they are under negative pressure as a result of needle valve assembly 118 providing open communication with vacuum line 160. Atmospheric pressure communicates with the negative anesthetic gas pressure by way of the open top of the capture chamber, thus substantially retaining the anesthetic gas within the chamber while it is vented into vacuum line 170. In this way, the anesthetic gas is

What is claimed is:

1. In a relief valve for a gas anesthesia line in a machine placed in a surgical room, such valve having a gas inlet port and a gas discharge means for pressure overloads, and valve closure means to seal such gas against passage through said discharge means, the improvement which includes
- a continuous wall spaced from the relief valve to define a chamber between said wall and said relief valve and in direct communication with said discharge means,
- means in said chamber communicating with ambient atmospheric pressures,
- a valve assembly mounted to said continuous wall and communicating with the chamber,
- a closed system discharge means,
- means on the valve assembly for mounting said closed system discharge means thereon to collect any overloading anesthetic gas, the pressure in said closed system being sufficiently lower than the ambient pressure such that upon opening of said valve closure means, the relieved gas will flow into said closed system through said chamber and valve assembly, and
- said valve assembly having means to control the passage of anesthesia gas from said relief valve through said valve assembly and into said closed discharge.

2. In a relief valve as in claim 1 wherein the closed system of said valve assembly is a vacuum line which creates negative pressure levels and wherein said chamber has an open top defining said means communicating with ambient pressure, which chamber and top are formed by said continuous wall spaced from and surrounding the relief valve, and a floor portion joining the bottom of the continuous wall to said relief valve to define the bottom of said chamber.